United States Patent Office 2,740,161
Patented Apr. 3, 1956

2,740,161
METHOD AND COMPOSITION FOR CASTING RESINS

Louis C. Rubens and Raymond F. Boyer, Midland, Mich., assignors to The Dow Chemical Company, Midland, Mich., a corporation of Delaware No Drawing. Application November 28, 1952, Serial No. 323,126

4 Claims. (Cl. 18—58)

This invention concerns a method and certain resin-containing compositions which permit ready filling of irregular-shaped spaces with continuous solid bodies of the compositions. It pertains especially to mixtures of certain benzene-soluble thermoplastic resins in finely divided form and certain liquids that are absorbed by the resins with resultant fusing together of the resin particles and formation of continuous solid bodies of the compositions. It also pertains to the filling of a vessel or chamber containing a fragile element, e. g. an electrical system involving an arrangement of fine wires, with such composition so as to form within the vessel or chamber a continuous solid body of the resin composition having the fragile element embedded therein.

There are numerous devices embodying delicate electric conductors, e. g. an arrangement of fine wires of copper or silver within a container or housing. Such conductors are frequently embedded in a body of a solid plastic material so as to protect them against breakage. This has heretofore been accomplished by filling the vessel, containing the conductors, with a polymerizable liquid such as styrene, solutions of polystyrene in monomeric styrene, or mixtures of styrene and other polymerizable compounds, and heating the vessel to polymerize the liquid and form a solid plastic material that embodies the conductors. These operations are time-consuming and, unless carefully carried out, may result in breakage or disengagement of one or more of the conductors. During the polymerization and subsequent cooling of the plastic mass, the polymerizate undergoes considerable shrinkage. This frequently results in breakage, displacement, or other damage to one or more of the conductors.

It has now been found that finely divided, benzene-soluble, thermoplastic alkenyl aromatic resins have a property of absorbing certain non-polymerizable organic liquids and, in doing so, of becoming fused together with resultant formation of a continuous resin-containing body that is solid at room temperature. Resins which are not thermoplastic, or are not soluble in benzene at room temperature, e. g. the cross-linked copolymers of styrene and divinylbenzene, cannot satisfactorily be used. Even when using a suitable resin, only a limited group of organic liquids having a certain relationship, hereinafter stated, to the resin can satisfactorily be employed for the purpose of the invention.

It has further been found that irregular-shaped spaces, particularly vessels containing the aforementioned fragile elements that are to be embedded in a solid plastic mass, can conveniently be filled with the latter by first pouring the finely divided resin into the vessel so as to form a compact body of the resin granules or particles about such elements and then pouring in a suitable liquid and permitting the mixture to stand. It is important that these steps be carried out in the order just stated. The finely divided resins, on being poured into a vessel, flow freely to fill irregular-shaped spaces with the same, and the liquids which are suitable for use in the invention readily flow through a mass of the resin particles or granules to fill the interstices. Accordingly, the above-stated steps are readily and conveniently carried out. However, the resin and liquid should not be premixed before being fed to the vessel, since the liquid rapidly renders the resin granules sticky. The mixture cannot conveniently be used to fill irregular-shaped spaces and, if forced into a vessel containing an arrangement of fine wires, is likely to cause breakage of the wires. The liquid can first be poured into the vessel and the granular resin be added, but such procedure is inconvenient and unsatisfactory.

Although the benzene-insoluble, granular copolymers of styrene and divinylbenzene cannot satisfactorily be used as the resin starting material in practice of the invention, the non-polymerizable organic liquid which is to be admixed with a granular, thermoplastic, benzene-soluble resin may, and sometimes with advantage, contain a minor amount, e. g. from 0.1 to 5 per cent by weight, of divinylbenzene or a mixture of divinylbenzene and a monoalkenyl aromatic compound such as styrene, ar-ethylvinylbenzene, or ar-vinyltoluene, etc., dissolved therein. The presence of a minor amount of such polymerizable compounds dissolved in the liquid starting material does not prevent practice of the invention and frequently causes an increase in strength of the solid resinous composition that is formed, i. e. the divinylbenzene and any other polymerizable compounds in the composition gradually become polymerized with formation of a polymer gel structure that adds to the strength of the entire solid resinous mass. However, the liquid starting material need not, and usually does not, contain such polymerizable ingredients.

The resins that are used in practice of the invention are solid, benzene-soluble, thermoplastic polymers (hereinafter termed "alkenyl aromatic resins") containing, in chemically combined form, 50 per cent by weight or more of at least one mono-alkenyl aromatic compound having the general formula:

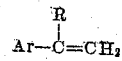

wherein Ar represents a monovalent aromatic radical of the benzene series and R represents hydrogen or the methyl radical. Examples of such alkenyl aromatic resins are polystyrene, the solid homopolymers of alpha-methylstyrene, ar-vinyltoluene, ar-vinylxylene, ar-ethylvinylbenzene, ar-methyl-alpha-methylstyrene, ar-chlorostyrene, or ar-chloro-ar-vinyltoluene; and solid copolymers of any two or more of such alkenyl aromatic compounds with one another, e. g. copolymers of styrene and alpha-methylstyrene or of styrene and ar-chlorostyrene; etc. Polystyrene is readily available at low cost and is preferred. The solid alkenyl aromatic resin starting material usually has a molecular weight of 25,000 or higher, e. g. of from 25,000 to 500,000, as determined by the Staudinger viscosity method. It is employed in finely divided form, e. g. as granules or particles of 20 mesh size or smaller, usually of from 20 to 60 mesh size, according to the Tyler screen scale.

The organic liquids which are employed are composed for the most part of non-polymerizable material, have boiling points of 55° C. or higher at atmospheric pressure, i. e. 760 mm. absolute pressure, and have mu values between 0.45 and 0.9 at 21° C. Liquids of lower boiling points, and having suitable mu values, can be used to convert a mass of such granular resin into a single continuous solid body, but are objectionable because of volatility. Organic liquids having boiling temperatures above 100° C., e. g. from 125° to 300° C. or higher, are preferably used.

The above-mentioned mu volume is a solvent-polymer interaction constant for the action of a liquid on a polymer in swelling or dissolving the latter. It varies somewhat with change in temperature; hence, the mu values herein given are expressed as 21° C. It may also vary with change in the kind of liquid or polymer employed. The mu value is usually ascribed to the liquid, but it is a constant expressing a relationship between a given liquid and polymer. In an instance in which a liquid does not dissolve, but does swell, a polymer, the mu value can be obtained by determining the average gram molecular weight M (or, for a cross-linked polymer, the average molecular weight, Mc, between cross-linkages in the polymer molecules); the density in grams per cubic centimeter of the dry polymer; the volume in cubic centimeters at 21° C. of one gram molecular weight of the liquid used for swelling the polymer as completely as possible at 21° C.; and the proportion by volume of the liquid in the swollen polymer. For a non-cross-linked polymer such as polystyrene, the mu value is then calculated in accordance with the equation:

$$\text{Mu} = -\left[\ln(1-V_2) + \left(1-\frac{1}{x}\right)V_2\right]/V_2^2$$

wherein $x$ is the ratio of the volume of one gram molecular weight of the polymer to the volume of one gram molecular weight of the liquid and $V_2$ is the proportion by volume of polymer in the gel formed by fully swelling the polymer with the liquid. For a cross-linked polymer such as a copolymer of styrene and divinylbenzene the mu value is calculated in accordance with the equation:

$$\text{Mu} = -[\ln(1-V_2) + V_2 + V_2^{1/3} dV_1/Mc]/V_2^3$$

wherein Mc has the meaning given above, $d$ is the density in grams per cc. of the dry polymer, $V_1$ is the volume of one gram molecular weight of the liquid and $V_2$ is the volume fraction of polymer in the fully swollen gel. In instances in which a polymer is dissolved by a liquid, the mu value may more satisfactorily be determined on the basis of an osmotic pressure or a light-scattering effect. The several ways, just mentioned, for determining mu values are given J. Polym. Sc., vol. 3, No. 1, pages 97–127 (1948) and on pages 339–343 and 374–377 of the A. C. S. monograph "Styrene," published in 1952 by the Reinhold Publishing Corporation of New York, and need not be repeated in detail.

The mu value of a given liquid is usually nearly the same with respect to a non-cross-linked alkenyl aromatic resin such as polystyrene as the mu value of said liquid toward a cross-linked alkenyl aromatic resin such as a copolymer of a major amount by weight of styrene, a lesser amount of ar-ethylvinylbenzene and from 0.02 to 0.1 weight per cent of divinylbenzene. The above-mentioned swelling method of determining mu values is more easily carried out with such cross-linked copolymer than with a non-cross-linked alkenyl aromatic resin. Accordingly, where a liquid is to be used with polystyrene, its mu value is usually determined with respect to such copolymer and is regarded as being the mu value with respect to polystyrene. The mu values given in the specific examples hereinafter presented were determined in this way. The mu values obtained in such indirect manner are not precise, but are sufficiently accurate for the purpose of the invention.

To be satisfactory for the purpose of the invention, an organic liquid must flow freely through a fair-sized bed of the finely divided resin to fill the interstices between the resin particles before swelling the latter sufficiently to prevent the flow. The liquids employed in the invention are one which at room temperature and within 24 hours flow to a depth of 2.5 inches or more through a bed of the resin which initially is in the form of particles or granules of from 20 to 60 mesh size according to the Tyler screen scale, and which within 24 hours are absorbed by the resin with formation of a continuous body of a composition that is solid at room temperature. A wide variety of liquids having mu values between 0.55 and 0.9 have been tested and all of them have been found to meet these requirements. Apparently any organic liquid which is sufficiently fluid, i. e. of low enough viscosity, for flow through the bed of granular resin and which has a mu value of from 0.55 to 0.9 can be used. Liquid hydrocarbons, particularly alkylbenzenes, having mu values of from 0.45 to 0.55 and having absolute viscosities of 1.2 centipoises or higher at 25° C. also met the above requirements and were satisfactory. However, liquid hydrocarbons having mu values of less than 0.55 and viscosities of less than 1.2 failed to meet one or more of the above requirements and were unsatisfactory. Nitrobenzene, which has a mu value of 0.475 with respect to polystyrene, causes excessively rapid swelling of the latter and is not suitable for use as the liquid starting material.

The above-described organic liquids which are suitable for use in the invention are poor solvents for the granular polymers, but are quite rapidly absorbed by the latter with resultant fusing together of the granules and formation of a single, continuous, solid body of the polymer composition. Such liquids flow freely through a fairly large body, i. e. through a depth of 2.5 inches or more of the finely divided resin without, or before, swelling the resin to an extent sufficient to prevent the flow. The absorption of such liquid by the polymer and conversion of the granular polymer into a continuous solid body of the resulting composition proceeds to completion at room temperature within 24 hours, usually in from 4 to 15 hours, after mixing the liquid with the polymer.

Liquids having mu values appreciably lower than 0.45 cause a rapid swelling of the resin granules which usually prevents rapid free flow of the liquid to a depth as great as 2.5 inches in a resin bed, i. e. to all parts of a small bed of the granular resin. Because of this, they fail to cause the resin granules throughout the mass to become fused together in a reasonable time, e. g. a day or less, with formation of a single continuous body that is solid at room temperature. Liquids having mu values higher than 0.9 fail to cause sufficiently rapid or extensive swelling of the polymer granules and fail to cause the granules to become fused together with formation of a single solid body. Liquids having mu values of from 0.55 to 0.8 are preferred.

The organic liquid starting material may be a single compound or a mixture of compounds. It is composed principally of non-polymerizable compounds, but may comprise a minor amount, e. g. 10 per cent by weight or less, of one or more polymerizable compounds, particularly divinylbenzene or mixtures of divinylbenzene and monovinyl aromatic compounds such as styrene, ar-ethylvinylbenzene, or ar-vinyltoluene, etc., which are retained in the continuous solid polymer composition that is formed and gradually become polymerized to form a cross-linked polymer gel throughout the composition with resulting increase in the strength and rigidity of the composition. However, the presence of polymerizable compounds is not required and the liquid starting material usually does not contain such compound.

Although it is necessary that the liquid starting material have a mu value, with respect to the polymer, of from 0.45 to 0.9 and, except for certain hydrocarbons, of 0.55 or above, in the instance in which the liquid is a solution of more than one compound it is not necessary that the individual ingredients have mu values within said range. For instance, the liquid may be a solution of a compound having a mu value within said range and a compound having a mu value outside said range, or of a compound having a mu value above said range and another compound having a mu value below the range, provided the liquid as a whole has a mu value within the range and meets the other requirements hereinbefore mentioned. However, it is preferred that the liquid consist of one or more compounds having mu values within the above-stated range.

In applying the invention for purpose of forming a protective solid body of the polymeric composition about the fine wires of an electric system in a box-like container, the finely-divided polymer, e. g. polystyrene, is poured into the container in amount sufficient to cover the wires. The container may be tapped or gently shaken to cause the powdered, or granular, polymer to settle as a compact mass about the wires. A liquid having the above-stated properties, e. g. a boiling temperature of 55° C. or higher at atmospheric pressure and a mu value of from 0.45 to 0.9, preferably from 0.55 to 0.8, at 21° C., is poured into the container in amount sufficient to fill the interstices between the polymer particles or granules. The amount of liquid is such that the resulting mixture is a thick paste, or body, of the polymer and liquid and not a thin slurry of polymer particles in a large excess of liquid. Introduction of the liquid is usually continued until a continuous liquid phase is visible at the upper surface of the compact body of polymer granules, but the latter are not covered to an appreciable depth, e. g. of ⅛ inch or more, by a layer of liquid alone. The liquid is preferably in amount barely sufficient to cover the polymer.

The mixture is formed at moderate temperatures, e. g. at from 0° to 60° C. or thereabout and usually at room temperature. It may be permitted to stand at any temperature within the range just stated until transformed into a continuous solid body, but is usually allowed to stand at room temperature.

On standing at room temperature for several hours, e. g. from 2 to 24 hours, the liquid becomes completely absorbed by the solid polymer and the particles or granules of the latter become fused together with resultant formation of a continuous solid body of the polymer composition having the wires embedded therein. Absorption of the liquid by the resin with formation of a continuous solid body of the resulting composition can be accelerated by moderate warming of the mixture, e. g. to temperatures in the order of from 30° to 60° C. A rise in temperature causes a lowering both in the mu value and the viscosity of the liquid and resulting increases both in the rate of flow of the liquid through the mass of finely divided resin and in the rate at which the liquid is absorbed by and swells the resin. The absorption of the liquid by the granular polymer to form the continuous solid body seldom, if ever, results in temperature changes, or in development of localized pressures or conditions of strain within the polymer composition, sufficient to break, disengage, or damage the fine wires or other elements embedded in the composition.

The solid body of polymer composition, thus formed, frequently contains small bubbles of entrapped air, but these do not impair the usefulness of the composition in protecting the fine wires embedded therein against breakage. Occurrence of such air bubbles can be avoided by evacuating air or other gases from the container having the wires therein after covering the wires with the finely divided polymer, and feeding the liquid starting material into the evacuated container. After introducing the liquid in amount such as to fill the interstices between the polymer particles, air may be admitted to the container. The resulting mixture of polymer and liquid changes on standing for a few hours at room temperature, into a continuous solid mass that is substantially free of bubbles. The transformation of the mixture into a continuous solid body can be accelerated by moderate warming, e. g. at temperatures of from 30° to 60° C.

The following examples describe ways of practicing the invention and illustrate certain of its advantages, but are not to be construed as limiting the invention.

EXAMPLE 1

This example shows the desirability of using, in the compositions of the invention, liquids having mu values within a range of from 0.55 to 0.9 and, for purpose of comparison, includes compositions which contain liquids of lower and higher mu values. The polymer employed in each experiment was polystyrene of a usual molding grade having an average molecular weight of about 100,000, which polystyrene was in the form of spherical beads of from 20 to 50 mesh size according to the Tyler screen scale. In each experiment, 20 grams of the polystyrene beads were poured into a glass tube of 1¼ inches internal diameter, thus filling the tube to a polymer bed depth of about 1¼ inches. Nine cubic centimeters of an organic liquid, having a mu value at 21° C. given in the following table, was poured into the tube. During, and after, this operation the mixture was examined for physical changes that occurred and particularly to determine whether the liquid flowed freely within the bed to fill the interstices between the polystyrene beads. In some instances this occurred. In other instances, the liquids very rapidly swelled the beads on contacting the latter with formation of a gel that plugged the bed and prevented free flow of the liquid to parts of the bed. Each mixture of polystyrene and liquid was permitted to stand at room temperature for 24 hours after formation of the mixture and was then re-examined to determine whether the liquid had diffused uniformly throughout the mass and whether the beads had become fused together with loss of their individual identity and formation of a single continuous solid body of the composition. The table names the liquid used in each experiment and gives its mu value at 21° C. It indicates, for each experiment, whether the liquid caused noticeable swelling of the polymer beads in contact therewith during the 24 hour period; whether the liquid diffused uniformly throughout the mass of beads in 24 hours; and whether, in the 24 hours of standing, the beads were all fused together, thus losing their identity, with formation of a single solid body of the resulting composition. It may be mentioned that the mu values given in the table were determined by swelling separate portions of a copolymer of styrene, a minor amount of ar-ethylvinylbenzene and approximately 0.035 per cent by weight of divinylbenzene with the respective liquids named, but that they are approximately the mu values of the liquids with respect to polystyrene.

Table I

| Run No. | Liquid | | Action of Liquid on Beads In 24 hrs. | | |
|---|---|---|---|---|---|
| | Kind | mu Value | Swells Beads | Diffuses Homogeneously Throughout Mass | Fuses beads together with loss of their identity and formation of a coherent solid mass |
| 1 | Phenylcyclohexane | 0.417 | Yes | No | No. |
| 2 | Styrene | 0.424 | Yes | No | No. |
| 3 | p-Xylene | 0.436 | Yes | No | No. |
| 4 | Phenyl n-butyl ketone | 0.457 | Yes | No | No. |
| 5 | Tetrachloroethylene | 0.459 | Yes | No | No. |
| 6 | Pyridine | 0.464 | Yes | No | No. |
| 7 | Nitrobenzene | 0.475 | Yes | No | No. |
| 8 | Toluene 80 wt. percent / n-Propanol 20% | 0.479 | Yes | No | No. |
| 9 | Diethyl carbonate | 0.503 | Yes | No | No. |
| 10 | Toluene 70% / n-Propanol 30% | 0.523 | Yes | No | No. |
| 11 | Amyl acetate | 0.58 | Yes | Yes | Yes. |
| 12 | Toluene 60% / n-Propanol 40% | 0.592 | Yes | Yes | Yes. |
| 13 | Cyclohexane | 0.60 | Yes | Yes | Yes. |
| 14 | Methylcyclohexane | 0.74 | Yes | Yes | Yes. |
| 15 | ar-Diethyltetrachlorobenzene | 1.85 | Yes | Yes | Yes. |
| 16 | Tri-cresyl phosphate | 0.87 | Yes | Yes | Yes. |
| 17 | Toluene 40% / n-Propanol 60% | 1.2 | Slightly | Yes | No. |
| 18 | Nitromethane | 1.93 | Slightly | Yes | No. |
| 19 | Hexane | 2.67 | Slightly | Yes | No. |
| 20 | n-Propanol | 4.84 | No | Yes | No. |

It may be mentioned that the unsatisfactory compounds having mu values between 0.45 and 0.55 which are shown in runs 4–10 of the above table either are organic compounds other than hydrocarbons or consist for the most part of a hydrocarbon, i. e. toluene, having a viscosity of less than 1.2 centipoises at 25° C. It will be shown in a subsequent example that liquid hydrocarbons having mu values between 0.45 and 0.55, and having viscosities of at least 1.2 centipoises at 25° C., are satisfactory for use in the invention.

EXAMPLE 2

A U-shaped glass rack having several turns of copper wire of approximately 0.01 inch diameter wound over the parallel arms thereof so as to be drawn tightly between the arms, was placed in an upright position in a cylindrical glass vessel of approximately 2.5 inches internal diameter. Each turn of wire was spaced apart from the next turn so as to permit flow of an electric current through the length of the wire. The rack was of a size such as to fit snugly inside the vessel. The several turns of wire over the arms of the rack were about 1.5 inches above the bottom of the vessel. The ends of the wire extended over the side of the vessel. The vessel was then filled to a depth of about 3 inches with polystyrene beads of from 20 to 50 mesh size. Sufficient ar-diethyltetrachlorobenzene was poured into the vessel to fill the interstices between the polystyrene beads, i. e. for each 10 grams of polystyrene beads there was added approximately 4.5 cubic centimeters of ar-diethyltetrachlorobenzene. The vessel and its contents were allowed to stand at room temperature for 24 hours and then examined. The polystyrene beads had become fused together and had absorbed the ar-diethyltetrachlorobenzene with formation of a single solid body of the resulting composition having the wire embedded therein. An electric current was then passed through the wire, thus showing that the wire had not been broken.

EXAMPLE 3

A cylindrical glass vessel of 1¼ inches internal diameter was filled to a depth of about 1¼ inches with 20 grams of polystyrene beads similar to those employed in Example 1. The vessel was closed and air was evacuated therefrom. A liquid solution, of approximately 9 cubic centimeters of ar-diethyltetrachlorobenzene, 2 cubic centimeters of a mixture of approximately equal parts by weight of divinylbenzene and ar-ethylvinylbenzene, and 0.4 gram of benzoyl peroxide, was drawn upward into the vessel through a line connected with the bottom of the vessel. The vessel and its contents were warmed at 50° C. for 24 hours. At the end of the first hour of warming, the polystyrene beads were fused together and had absorbed the liquid, i. e. the composition in the vessel was a continuous solid body. After the 24 hours of warming at 50° C. the solid composition was removed from the vessel and a strip having dimensions of 0.1 inch x 0.1 inch x 1.25 inches was cut from the mass. This strip was suspended for one hour in a bath of liquid dimethylsiloxane heated at 135° C. It did not undergo appreciable distortion during this heating operation.

EXAMPLE 4

In each of a series of tests, a liquid was poured into the top of a glass column containing a deep bed of polystyrene granules of from 20 to 60 mesh size and, approximately 24 hours after adding the liquid, the column was examined to determine the depth to which the liquid had penetrated into the bed. All of the tests were carried out at atmospheric pressure and at a temperature of about 28° C. Stoppage of the flow of liquid through a bed was, in each instance, due to action of the liquid in swelling the polystyrene granules. The experiments differed from one another as to the kind of liquid used. Table II names the liquid used in each experiment, gives its mu value at 21° C. and, in instances in which the viscosity was measured, gives its absolute viscosity in centipoises at 25° C. The table also gives the depth in inches to which the liquid penetrated into the bed. In instances in which the liquids were mixtures of compounds, the table names the ingredients and gives the proportion of each as per cent by weight.

Table II

| Run No. | Liquid Kind | mu Value | Viscosity, cps. at 25° C. | Inches of flow into bed |
|---|---|---|---|---|
| 1 | Nitrobenzene | 0.475 | 1.867 | 0.4 |
| 2 | Toluene | 0.44 | 0.554 | 0.7 |
| 3 | Toluene 90% + Propanol 10% | 0.455 | 0.574 | 1.2 |
| 4 | Diethylbenzene | 0.445 | 0.838 | 1.4 |
| 5 | Diethyl carbonate | 0.503 | 0.753 | 2.0 |
| 6 | Triethylbenzene | 0.456 | 1.555 | 2.7 |
| 7 | Triethylbenzene 80% + Tri-isopropylbenzene 20% | 0.475 | 1.457 | 3.1 |
| 8 | Triethylbenzene 60% + Tri-isopropylbenzene 40% | 0.488 | 1.744 | 3.7 |
| 9 | Triethylbenzene 50% + Tri-isopropylbenzene 50% | 0.497 | 1.925 | 4.3 |
| 10 | Triethylbenzene 40% + Tri-isopropylbenzene 60% | 0.512 | 2.157 | 5.5 |
| 11 | Tetraethylbenzene | 0.469 | 3.141 | 7.1 |
| 12 | Amyl acetate | 0.58 | 0.840 | 7.1 |
| 13 | Acetone | 0.74 | 0.333 | 8.2 |
| 14 | Decahydronaphthalene | 0.55 | | 11.0 |
| 15 | Tri-isopropylbenzene | 0.725 | 3.704 | >50.0 |

Attention is directed to runs 1, 5, 12 and 13 of the table which describe tests of nitrobenzene, diethyl carbonate, amyl acetate and acetone, respectively, as liquid starting materials. The nitrobenzene and diethyl carbonate have mu values of less than 0.55 and do not flow deeply enough into the resin bed to be satisfactory for use in the invention, but the other oxygen-containing compounds just mentioned, have mu values greater than 0.55 and are satisfactory. Runs 2-4 and 6-11 of the table show that liquid hydrocarbons having mu values between 0.45 and 0.55 and viscosities of 1.2 centipoises or higher at 25° C. are satisfactory, but that liquid hydrocarbons of lower viscosity and having mu values in, or only slightly below, this range do not penetrate deeply enough into the resin bed to be satisfactory for use in the invention. Run 6 shows that triethylbenzene alone penetrated a bed of finely divided polystyrene to a depth of only 2.7 inches before swelling the polymer to an extent which prevented further liquid flow, i. e. the depth of penetration was sufficient, but not as great as desired, for practice of the invention. In contrast, run 15 shows that tri-isopropylbenzene penetrated such bed to a depth of greater than 50 inches. However, the rate of absorption of tri-isopropylbenzene by polystyrene, although adequate, is slower than is usually desired. Runs 7-10 show that mixtures of triethylbenzene and tri-isopropylbenzene penetrate the polystyrene beds to depths that are adequate for most purposes, and these liquid mixtures are quite rapidly absorbed by polystyrene. In other words, all possible mixtures of triethylbenzene and tri-isopropylbenzene are superior to either of the individual ingredients for the purpose of the invention.

We claim:

1. A resin casting method which comprises pouring a finely-divided, solid, benzene-soluble, thermoplastic alkenyl aromatic resin, consisting of a polymer of at least one monoalkenyl aromatic compound having the general formula:

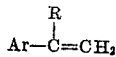

wherein Ar represents a monovalent aromatic radical of the benzene series and R represents a member of the group consisting of hydrogen and the methyl radical, into a vessel to form a bed of the finely divided resin, adding to the bed, in amount corresponding approximately to that required to fill the interstices between the particles, a liquid at least 90 per cent by weight of which consists of at least one compound selected from the group consisting of triethylbenzene and triisopropylbenzene and the remainder of which liquid consists of at least one material selected from the group consisting of triethylbenzene, triisopropylbenzene, divinylbenzene, and mixtures of divinylbenzene and at least one monovinyl aromatic compound, and which liquid is sufficiently fluid to permit flow of the same through the bed, has a mu value with respect to the resin of from 0.45 to 0.9 at 21° C. and, when of a mu value of from 0.45 to 0.55 at 21° C., has a viscosity greater than 1.2 centipoises at 25° C., and causing the liquid to be absorbed by the resin with fusion together of the resin particles and formation of a single solid body of the resulting composition by permitting the mixture to stand.

2. A method, as claimed in claim 1, wherein the resin is polystyrene and the liquid is a mixture of triethylbenzene and tri-isopropylbenzene.

3. A solid resin composition consisting essentially of a solid, benzene-soluble, thermoplastic alkenyl aromatic resin having absorbed therein a liquid, at least 90 per cent by weight of which liquid consists of at least one compound selected from the group consisting of triethylbenzene and triisopropylbenzene and the remainder of which liquid consists of at least one material selected from the group consisting of triethylbenzene, triisopropylbenzene, divinylbenzene, and mixtures of divinylbenzene and at least one monovinyl aromatic compound, and which liquid is sufficiently fluid to permit flow of the same through a bed of the granular resin, has a mu value with respect to the resin of from 0.45 to 0.9 at 21° C. and, when of a mu value of from 0.45 to 0.55 at 21° C., has a viscosity greater than 1.2 centipoises at 25° C., which resin is a polymer of at least one monoalkenyl aromatic compound having the general formula:

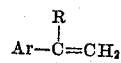

wherein Ar represents a monovalent aromatic radical of the benzene series and R represents a member of the group consisting of hydrogen and the methyl radical, and which composition is formed by adding to the finely divided resin the liquid, in amount corresponding approximately to that required to fill the interstices between the resin particles, and causing the liquid to be absorbed by the resin particles with formation of a single solid body of the composition by permitting the mixture to stand.

4. A composition, as claimed in claim 3, wherein the resin ingredient is polystyrene and the liquid ingredient is a mixture of triethylbenzene and tri-isopropylbenzene.

References Cited in the file of this patent

UNITED STATES PATENTS

| 2,297,248 | Rudolph | Sept. 29, 1942 |
| 2,300,495 | Gerhart | Nov. 3, 1942 |
| 2,335,371 | Willis | Nov. 30, 1943 |
| 2,511,436 | Kauth | June 13, 1950 |

FOREIGN PATENTS

| 522,552 | Great Britain | June 20, 1940 |